United States Patent [19]
Kurita et al.

[11] 4,257,275
[45] Mar. 24, 1981

[54] VELOCITY DETECTING APPARATUS

[75] Inventors: Yoshio Kurita; Yukitake Shibata, both of Musashino, Japan

[73] Assignee: Yokogawa Electric Works, Ltd., Tokyo, Japan

[21] Appl. No.: 72,007

[22] Filed: Sep. 4, 1979

Related U.S. Application Data

[62] Division of Ser. No. 912,954, Jun. 6, 1978, Pat. No. 4,201,083.

[30]     Foreign Application Priority Data

Jun. 10, 1977 [JP]     Japan ................................. 52/69269

[51] Int. Cl.$^3$ ............................. G01F 1/70; G01P 5/18
[52] U.S. Cl. .................. 73/861.06; 324/160; 364/510
[58] Field of Search ............. 73/194 E, 194 F, 194 A, 73/861.06; 364/518, 821, 565; 324/160, 175, 71 H

[56]     References Cited
U.S. PATENT DOCUMENTS

| | | | |
|---|---|---|---|
| 3,762,221 | 10/1973 | Coulthard | 73/194 E |
| 3,813,939 | 6/1974 | Head | 73/194 E |
| 3,844,170 | 10/1974 | Critten | 73/194 E |
| 4,019,038 | 4/1977 | Critten et al. | 73/194 E X |

OTHER PUBLICATIONS
Fisher et al., "The Crossed Beam Correlation Technique", *U. Fluid Mech.*, 1967, vol. 28, part 4, pp. 705-717.

*Primary Examiner*—Charles A. Ruehl
*Attorney, Agent, or Firm*—Parmelee, Johnson, Bollinger & Bramblett

[57]     ABSTRACT

Noise signals from a relatively moving object, such as those caused by eddies in a fluid or by protrusions and recesses or gradation on the surface of paper or an iron plate, are sensed at two or more points spaced in the direction of the motion. A difference signal is then obtained from the resulting two noise signals. The relative velocity of the object is detected from the difference signal by utilizing the autocorrelation function or the frequency spectrum of the difference signal.

3 Claims, 14 Drawing Figures

VELOCITY DETECTING APPARATUS

This is a division, of application Ser. No. 912,954, filed June 6, 1978, now U.S. Pat. No. 4,201,083.

BACKGROUND OF THE INVENTION

1. Field of the Invention

The present invention relates to a correlation type velocity detecting apparatus capable of sensing noise signals obtained at two points spaced from each other by a certain fixed distance in the direction of motion of the object, and of detecting the velocity of the moving object according to the correlation between the two signals thus sensed.

2. Description of the Prior Art

FIG. 1 is a block diagram of a known flow meter used to detect the velocity of a fluid through a duct according to the correlation thereof. In this diagram, a fluid or object to be measured flows through a duct 1. Ultrasonic transmitters 21 and 22 are attached to the duct 1, and ultrasonic receivers 31 and 32 are attached to the duct 1 across from the ultrasonic transmitters 21 and 22 respectively. An oscillator 4 applies a drive signal to the ultrasonic transmitters 21 and 22. Demodulators 51 and 52 demodulate the signals from the ultrasonic receivers 31 and 32 and apply them to a correlator 6. The correlator 6 takes the cross correlation of input signals received from the demodulators 51 and 52.

Such a conventional flow meter operates as follows. When the ultrasonic transmitters 21 and 22 are driven by the signal from the oscillator 4, ultrasonic signals produced therefrom propagate through the fluid to be measured and reach the ultrasonic receivers 31 and 32. In propagation paths $P_1$ and $P_2$, the ultrasonic signals are affected by the flow noise such as inherent fluctuations or eddies existing in the fluid, so the signals obtained from the ultrasonic receivers 31 and 32 are modulated by the flow noise. (Here, the term "modulation" is defined to include frequency modulation, amplitude modulation, phase modulation and so forth.) The demodulators 51 and 52 serve to demodulate the modulated signals from the ultrasonic receivers 31 and 32. If the pattern of the noise signal in the flow remains unchanged between the two receivers, a signal x(t) as shown in FIG. 2(a) is obtained from the demodulator 51, and a signal y(t) as shown in FIG. 2(b) is obtained from the demodulator 52. The propagation paths $P_1$ and $P_2$ of the ultrasonic signals are spaced apart from each other by a distance L in the direction of flow of the fluid to be measured, so the fluid having passed through the propagation path $P_1$ comes to pass through the path $P_2$ after the lapse of time $\tau_0$. Accordingly, the signals x(t) and y(t) obtained from the demodulators 51 and 52 are represented by the following equation.

$$y(t) = x(t - \tau_0) \quad (1)$$

The flow velocity v of the fluid to be measured, the time $\tau_0$ and the distance L between the propagation paths $P_1$ and $P_2$ are related as follows:

$$\tau_0 = L/v \quad (2)$$

The correlator 6 takes the cross correlation between signals x(t) and y(t) from the demodulators 51 and 52, and produces a correlation signal $\phi_{xy}$ of FIG. 3(a) through the output terminal thereof. The cross correlation signal $\phi_{xy}$ can be expressed as $$\phi_{xy} = \lim_{T \to \infty} \frac{1}{T} \int_0^T x(t) y(t + \tau) dt \quad (3)$$
$$= \lim_{T \to \infty} \frac{1}{T} \int_0^T x(t) x(t + \tau - \frac{L}{v}) dt$$

Equation (3) represents the autocorrelation of x(t), which is maximum when $\tau - (L/v) = 0$. That is, $\phi_{xy}$ has a maximum value when $\tau = (L/v) = \tau_0$. Therefore, by obtaining $\tau_0$ at which $\phi_{xy}$ becomes maximum in FIG. 3, the flow velocity v of the fluid can be found from Equation (2) as follows:

$$v = (L/\tau_0) \quad (4)$$

where L is the distance between the propagation paths $P_1$, $P_2$ and remains constant.

Since the flow meter based on the above principle utilizes a signal inherent to the turbulent flow, it has an advantage of not requiring a flow-rate measuring means such as an orifice or eddy generating element in the fluid. However, the measurement may be rendered impossible by the periodicity of the correlation function resulting from the periodic disturbance such as vibration of the duct 1 or internal pressure variation in the fluid. That is, where the ultrasonic receivers 31 and 32 pick up the inphase disturbance component z(t) as a result of the vibration of the duct 1 or the internal pressure variation in the fluid, the cross correlation signal $\phi_{xy}'$ is expressed as follows:

$$\phi_{xy}' = \lim_{T \to \infty} \frac{1}{T} \int_0^T \{x(t) + z(t)\} \cdot \{y(t + \tau) + z(t + \tau)\} dt \quad (5)$$
$$= \phi_{xy} + \lim_{T \to \infty} \frac{1}{T} \int_0^T [x(t)z(t + \tau) + z(t)y(t + \tau) + z(t) z(t + \tau)] dt$$

In Equation (5), the final term within the integral represents the autocorrelation of the disturbance component z(t). As this value increases, $\phi_{xy}$ becomes unobtainable rendering measurement impossible. (Refer to FIG. 3(b))

An object of the present invention is to provide an improved relative-velocity detecting apparatus which is free from influence of any periodic disturbance component such as the vibration of an object or a duct to which a detecting means is attached or the pressure variation in a moving fluid.

SUMMARY

In accordance with the invention in one of its aspects, noise signals from a moving object such as a fluid are detected at two points spaced in the direction of the motion. The difference between the two noise signals is obtained in an operational circuit and a signal related to the velocity of the moving object is derived from the difference signal.

In accordance with one embodiment of the invention, the velocity signal is based on the autocorrelation function of the difference signal.

In accordance with another embodiment, the velocity signal is based on the frequency spectrum of the difference signal.

In accordance with the invention in another of its aspects, the difference signal is transmitted along a transmission line which also provides power to the operational circuit.

In accordance with the invention in another of its aspects, an autocorrelator signal is applied to a processor which produces a velocity signal and sets the sampling rate of the autocorrelator in accordance with the autocorrelator output.

DESCRIPTION OF THE PREFERRED EMBODIMENTS

Figure 1:
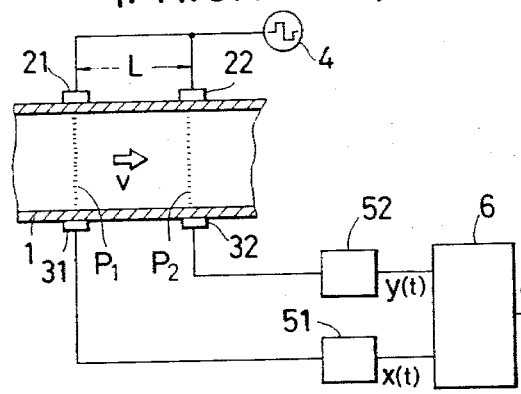
FIG. 1 is a block diagram of a known correlation type flow meter.
Figure 2:
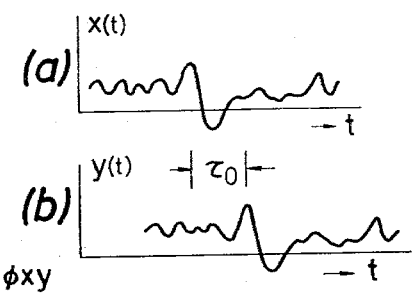
FIG. 2 graphically illustrates the signals x(t) and y(t) of the flow meter shown in FIG. 1.
Figure 4:
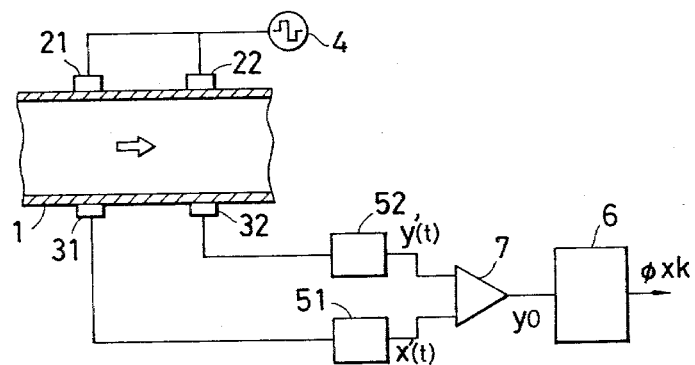
FIG. 4 is a block diagram of an embodiment of the present invention using autocorrelation of a difference signal.

The block diagram of FIG. 4 shows an embodiment of the present invention for detecting the velocity of a fluid flowing in a duct as in FIG. 1. In this embodiment, an operational circuit 7 is provided to compute the difference between the demodulated signals x'(t) and y'(t) from the demodulators 51 and 52. The output yo of the operational circuit 7 is applied to a correlator 6, from which the autocorrelation signal $\Phi kk$ of yo is obtained.

The apparatus of FIG. 4 operates in the presence of a disturbance component z(t) in the following manner. Signals x'(t) and y'(t) from the demodulators 51 and 52 are composed of respective signal components x(t) and y(t) with periodic disturbance component z(t), such as duct vibration or internal pressure variation, superposed thereon. The above demodulated signals are expressed respectively as $$x'(t) = x(t) + z(t) \quad (6)$$

$$y'(t) = y(t) + z(t) \quad (7)$$

The operational circuit 7 finds the difference between these two signals x'(t) and y'(t) and produces an output yo expressed as $$yo = x'(t) - y'(t) = x(t) - y(t) \quad (8)$$

The correlator 6 takes the autocorrelation of the difference signal of Equation (8). The autocorrelation signal $\Phi kk$ is represented by Equation (9) given below.

$$\begin{aligned}
\Phi kk &= \lim_{T \to \infty} \frac{1}{T} \int_0^T [x(t) - y(t)][x(t+\tau) - y(t+\tau)] \, dt \\
&= \lim_{T \to \infty} \frac{1}{T} \int_0^T x(t) x(t+\tau) dt + \\
&\quad \lim_{T \to \infty} \frac{1}{T} \int_0^T y(t) y(t+\tau) dt \\
&\quad - \lim_{T \to \infty} \frac{1}{T} \int_0^T x(t) y(t+\tau) dt - \\
&\quad \lim_{T \to \infty} \frac{1}{T} \int_0^T y(t) x(t+\tau) dt
\end{aligned} \quad (9)$$

Figure 3:
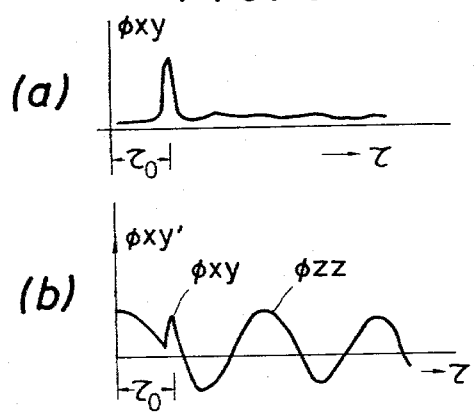
FIG. 3 graphically illustrates the signals $\phi_{xy}$ and $\phi_{xy}'$ of the flow meter shown in FIG. 1.
Figure 5:
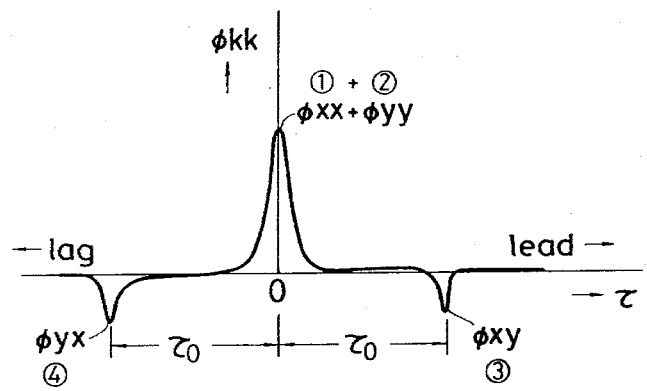
FIG. 5 illustrates the output of the apparatus shown in FIG. 4.

In Equation (9), the first and second terms of the right side are autocorrelation functions $\phi xx$ and $\phi yy$ of x(t) and y(t) respectively. If the signal component is in the proximity of white noise, it indicates a sharp peak under the condition of $\tau = 0$. The fourth term further advances x(t) with respect to time; thus there is no peak of the correlation value within a range of $\tau > 0$. The third term represents the cross correlation signal component of x(t) and y(t). Accordingly, the autocorrelation signal $\Phi kk$ obtained from the correlator 6 is of a waveform that indicates a positive peak in $\phi xx$ and $\phi yy$ and negative peaks in $\Phi xy$ and $\Phi yx$ as shown in FIG. 5. It is then possible to obtain a time lag or a time lead $\tau_0$ in this waveform and to find the flow velocity of the fluid from Equation (4). As will be apparent from FIG. 5 when compared to FIG. 3(b), a periodic correlation resulting from disturbance does not appear. Consequently, $\tau_0$ is easily obtainable without being affected by the disturbance component.

In the foregoing embodiment ultrasonic signals are used to detect the noise signals obtained from the moving object to be measured. It is also possible to utilize a laser or light signal with suitable transducers 21, 22, 31 and 32. Or, where the moving object is a fluid, detection can be achieved by disposing a fluid-displacement detecting element such as heating wire, thermistor, platinum wire or the like in the fluid.

In comparison with the conventional apparatus a correlation-type velocity detecting apparatus in accordance with the present invention has a variety of advantageous features including:

(i) The measurement is completely free from the influence of a disturbance such as fluctuation of a moving object or vibration of an object to which two detecting means are attached.

(ii) The structure is simplied since the correlator is merely an autocorrelation function.

Figure 6:
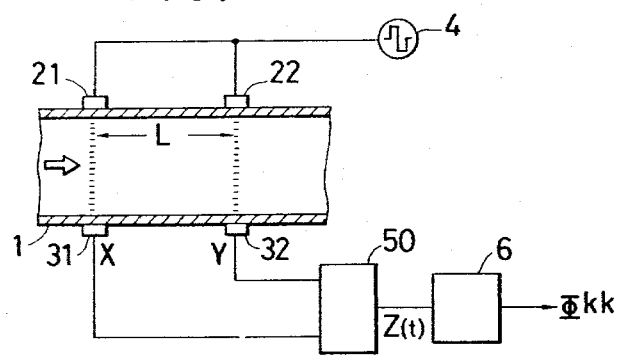
FIG. 6 is a block diagram of another embodiment of the invention using autocorrelation of a phase-difference signal.
Figure 7:
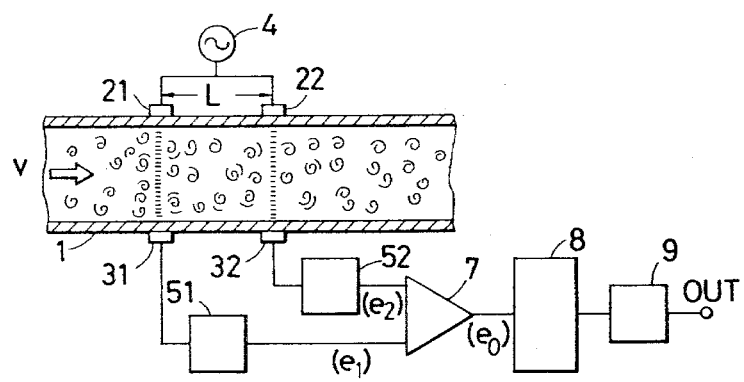
FIG. 7 is a block diagram of another embodiment of the invention using the frequency spectrum of a difference signal.
Figure 11:
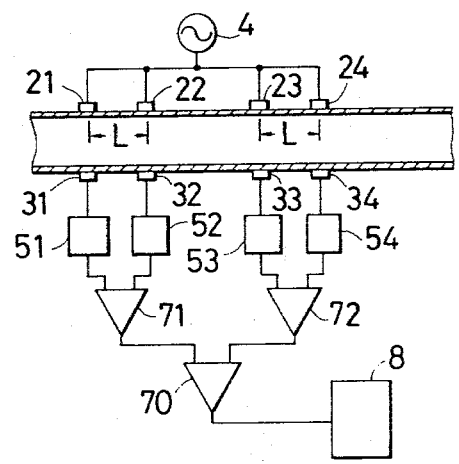
FIG. 11 is a block diagram of yet another embodiment of the invention using multiple difference signals and a frequency spectrum.

FIGS. 6, 7 and 11 are block diagrams of other embodiments of the invention for detecting the velocity of a fluid flowing in a duct. In the embodiment of FIG. 6, signals X and Y from ultrasonic receivers 31 and 32 are applied to a phase demodulating operational circuit 50 which demodulates the phase difference between X and Y to produce $Z(t)=x(t)-y(t)$. This signal is then applied to a correlator 6 where the autocorrelation signal $\Phi kk$ of $Z(t)$ is obtained.

In the embodiment of FIG. 6 signals $x(t)$ and $y(t)$ from the ultrasonic receivers 31 and 32 are applied to the phase demodulator 50 and one of the signals is used as a reference while the other signal is phase-demodulated. Spurious signals due to vibration of the duct or change of the propagation time resulting from temperature fluctuation in the fluid are eliminated because such components in the received signals $x(t)$ and $y(t)$ cancel out. The demodulated signal $Z(t)$ is thus free from influence of the disturbance.

The correlator 6 takes the autocorrelation of the demodulated signal $Z(t)$ obtained from the phase demodulator 50. The autocorrelation signal $\Phi kk$ is represented by the foregoing Equation (9). Accordingly, it is possible to find from $\tau_0$ of FIG. 5 the flow velocity of the fluid as in the apparatus of FIG. 4.

In the embodiment of FIG. 7, signals $e_1$ and $e_2$ from demodulators 51 and 52 are applied to an operational circuit 7 which computes the difference between the two input signals and produces a difference signal $e_0$. This difference signal is applied to a spectrum analyzer 8 for frequency analysis. A frequency detector 9 is connected to the output of the spectrum analyzer 8.

Figure 8:
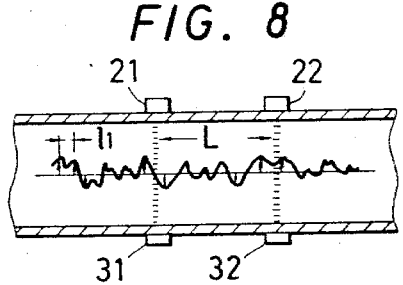
FIG. 8 shows a frequency spectrum of the quadrature velocity component of the fluid in the apparatus of FIG. 7.

The embodiment of FIG. 7 operates in the following manner. If the fluid in the duct 1 is of a turbulent flow, irregular eddies and fluctuations mingle therein and flow at the velocity v of the fluid. In the propagation path between the ultrasonic transmitter 21 and the ultrasonic receiver 31, the ultrasonic signal is modulated by the flow component in the direction of the propagation path perpendicular to the direction of flow. A pattern of the quadrature component perpendicular to the flow direction and contributing to modulation of the ultrasonic signal has an irregular waveform as illustrated in FIG. 8. The ultrasonic receivers 31 and 32 sense at two points such irregular velocity components perpendicular to the flow direction, and the signals obtained therefrom are demodulated.

Figure 9:
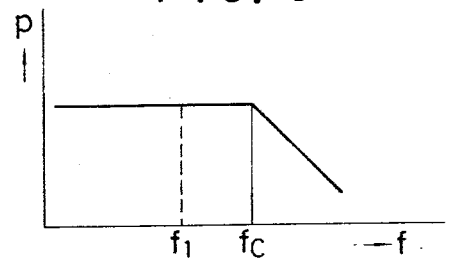
FIG. 9 shows a waveform representing an exemplary pattern of the quadrature velocity component contained in the fluid in the apparatus of FIG. 7.

Observing the frequency spectrum of the demodulated signals experimentally, it has been ascertained to be white noise of a limited frequency band as shown in FIG. 9. In this case, generation of a frequency $f_1$ results from a frequency component $f_1=(v/l_1)$ produced when the quadrature velocity components arrayed at the spatial period $l_1$ (Refer to FIG. 8) traverse the propagation path at the velocity v. In the spectrum of FIG. 9, the components of any frequencies lower than the corner frequency $f_c$ have a fixed amplitude. This signifies that the quadrature velocity components arrayed at an interval greater than $lc=(v/fc)$ are present at the same rate and that the quadrature velocity components at various intervals are present irregularly.

In this embodiment, qradrature velocity components are detected at two points spaced apart from each other by a distance L in the flow direction, and the difference between the respective demodulated signals $e_1$ and $e_2$ is computed by the operational circuit 7. The quadrature velocity components of a period corresponding to the distance L cancel out, while the quadrature velocity components of a period corresponding to $L/(N+\frac{1}{2})$ (N being an integer) are emphasized. This relationship is inverted in the case of computing the sum of $e_1$ and $e_2$.

Figure 10:
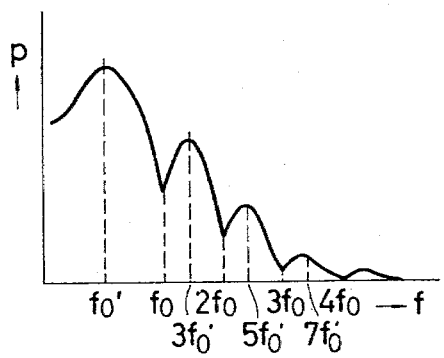
FIG. 10 shows a frequency spectrum of the difference signal between the quadrature velocity components detected at two points.

Therefore, when the output signal $e_0$ of the operational circuit 7 is applied to the spectrum analyzer 8, its frequency spectrum is as shown in FIG. 10, where the trough of the waveform denotes mutual cancellation of the quadrature velocity components and the peak of the waveform denotes mutual emphasis thereof. Consequently, through detection of the frequency $f_0$ of mutual cancellation of the quadrature velocity components, the velocity v of the fluid is obtained from the relationship of Equation (10) given below.

$$v = f_0 \cdot L \qquad (10)$$

Also the velocity v is obtained from $v=f'_0\cdot 2L$ by detecting the frequency $f'_0$ that represents mutual emphasis of the quadrature velocity components.

The frequency detector 9, which is composed of a combination of filter circuits, takes $f_0$ from the output signal of the spectrum analyzer 8 and produces an output frequency signal proportional to the velocity v through its terminal OUT.

FIG. 11 is a block diagram showing another embodiment using frequency spectrum analysis. This embodiment is equipped with four sets of ultrasonic receivers 31 and 32. Signals from ultrasonic receivers 31 and 32 are demodulated and applied to an operational circuit 71 which computes the difference between those input signals. Signals from ultrasonic receivers 33 and 34 are demodulated and applied to an operational circuit 72 which computes the difference between those input signals. And the difference signals obtained from the two operational circuits are computed by another operational circuit 70 to produce a final difference signal which is applied to a spectrum analyzer 8. By increasing the number of ultrasonic transmitters and receivers in this way, spatial filter effect is attained to ensure $f_0$ with greater accuracy in the frequency spectrum.

In addition to the foregoing examples of detecting the flow velocity of a fluid in a duct, it is also possible to utilize the present invention for detection of the velocity of a ship or airplane by installing two detecting means therein. Furthermore, the velocity of a moving iron plate or paper is detectable as well.

Figure 12:
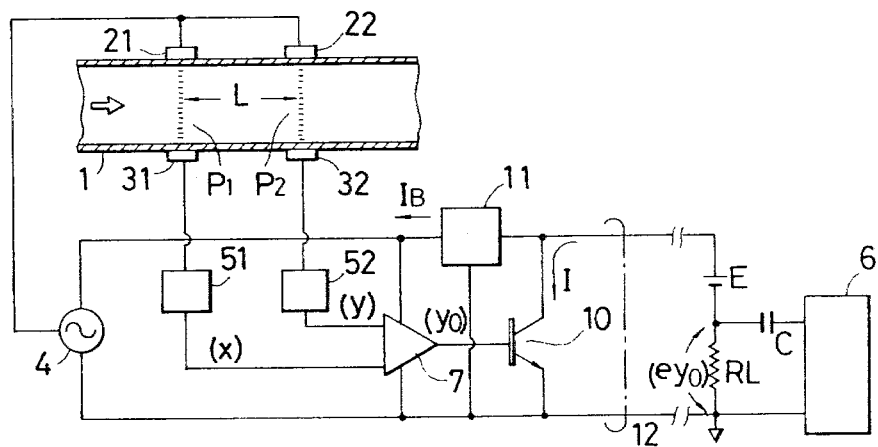
FIG. 12 shows a modification of the embodiment of FIG. 4 wherein the detecting end and the receiving end of a circuit are connected with each other by means of a two-wire transmission line.
Figure 13:
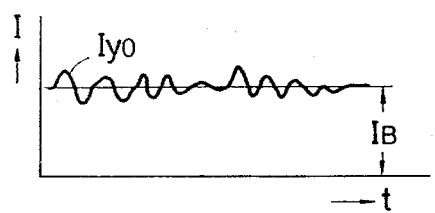
FIG. 13 illustrates an exemplary waveform of a transmission current in FIG. 12.

FIG. 12 shows a modified structure of the apparatus of FIG. 4, wherein the detecting end and the receiving end of the detector circuitry are connected with each other by means of a two-wire transmission line. In this example, the difference between output signals of demodulators 51 and 52 is computed by an operational circuit 7. The difference signal yo is then applied to a transistor 10 serving as a current control element. This transistor is connected in series with a d-c power source E and a current detecting resistor RL through a two-wire transmission line 12. Through a capacitor C a correlator 6 receives a signal produced across the resistor RL. The d-c power source E, the resistor RL and the correlator 6 are located on the receiving-end (instrument panel room), while the other components, connected through the two-wire transmission line 12, are located on the detecting-end. A constant voltage circuit 11 is connected in parallel with the transistor 10 (current control element) and comprises, for example, a constant current element and a constant voltage element. The constant voltage thus obtained is supplied as energizing power to the operational circuit 7 and the oscillator 4. In this apparatus, the transistor 10 (current control element) receives the difference signal yo from the operational circuit 7 and controls the load current I flowing in the transmission line 12 in accordance with the input signal. Accordingly, the load current I is composed of, as shown in FIG. 13, the current IB flowing in both the operational circuit 7 and the oscillator 4 and the difference signal Iyo superposed thereon. This current I is transmitted to the receiving end where a voltage eyo corresponding to the difference signal Iyo is produced across the resistor RL and is applied to the correlator 6 through the capacitor C. The correlator 6 takes the autocorrelation of the difference signal eyo to generate an autocorrelation signal $\phi$kk represented by Equation (9).

Although the embodiment of FIG. 12 is equipped with an autocorrelation on its receiving-end, a spectrum analyzer may be provided instead in order to analyze the frequency spectrum of the difference signal yo transmitted thereto. The principle of measurement in this case is the same as that in the apparatus of FIG. 7.

Figure 14:
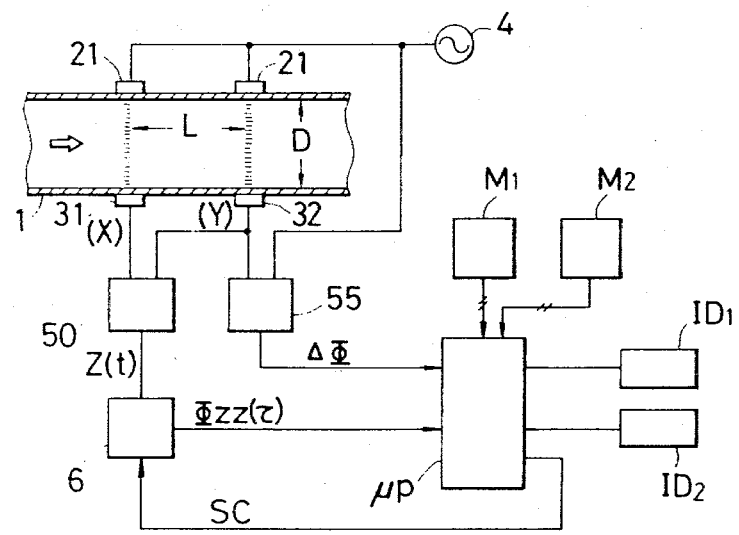
FIG. 14 is a block diagram of another embodiment of the invention using a processor and further providing a temperature signal.

FIG. 14 is a block diagram showing another embodiment of the present invention. In this embodiment, signals X and Y from ultrasonic receivers 31 and 32 are applied to a phase demodulator 50 where the phase difference between X and Y is demodulated to produce a signal Z(t), which is then applied to a real-time autocorrelator 6. The correlation function obtained therefrom is loaded at a proper period into a processor $\mu$P having a computing faculty. A phase demodulator 55 is provided for detecting the temperature of a moving object or fluid. Demodulator 55 demodulates the phase difference $\Delta\Phi$ between a signal Y from the ultrasonic receiver 32 and a signal fc from the oscillator 4. The demodulated signal $\Delta\Phi$ is represented by Equation (11) and is loaded into the processor $\mu$P at a proper period.

$$\Delta\Phi = \frac{2\pi fc \cdot D}{C} \tag{11}$$

where

C is the propagation velocity of an ultrasonic signal in the fluid.

fc is the frequency of the signal transmitted from oscillator 4.

D is the propagation distance of the ultrasonic signal.

Both the signal $\Phi$zz(t) from the real-time autocorrelator 6 and the signal $\Delta\Phi$ from the phase demodulator 55 are loaded into the processor $\mu$P. In the processor the following operation is performed:

(i) The peak point $\tau_0$ of the correlation function $\Phi$zz is detected.
(ii) Computation of $Vc = L/\tau_0$ is executed to obtain the fluid velocity Vc.
(iii) A check is carried out to ascertain whether $\tau_0$ is within the computing range of the correlation function and, according to the result of such check, a control signal Sc is applied to the correlator 6 if necessary, to thereby set the sampling rate of the correlator 6 to a proper value.
(iv) Computation of $$C = \frac{2\pi fc \cdot D}{\Delta\Phi}$$

is executed to obtain the propagation velocity C.
(v) The propagation velocity C generally corresponds to the temperature T of the propagating medium (moving object). Therefore, the relationship between them is stored in a memory circuit M1, and the temperature T is found with reference to the relationship stored. For example, if the moving object is a gas, the relationship is such as represented by Equation (12), computation of which is executed by the processor $\mu$P.

$$T = 273.15[(C/C_0)^2 - 1] \tag{12}$$

where $C_0$ is the propagation velocity at 0° C. and is stored previously.

(vi) If necessary, the velocity v is corrected by utilizing the temperature T to obtain a post-correction velocity vR. And the temperature T is shown by an indicator ID1.
(vii) When required, the following computation is also executed. Where the moving object is a fluid, the velocity vR is affected by a flow velocity distribution. Therefore, a correction coefficient k (flow velocity coefficient as a function of a Reynolds number Re) for correcting the influence of the flow velocity distribution is stored in a memory circuit M2. The flow velocity distribution is corrected for vR with reference to the stored function, and the post-correction velocity vm is shown by the indicator ID2.

According to this latter embodiment, the sampling rate of the correlator 6 can always be set to an optimal value by the processor $\mu$P to achieve a wide-range velocity detection. And it is possible to carry out measurement of and correction for the temperature whenever necessary without additional provision of any particular temperature detecting means.

We claim:

1. A velocity detecting apparatus comprising:
   means for detecting noise signals obtained from a relatively moving object at two or more points spaced apart from each other in the direction of the motion;
   an operational circuit for computing the phase difference between the two signals from said noise-signal detecting means;
   an autocorrelator receiving an input signal from said operational circuit; and
   a processor receiving an input signal from said autocorrelator, detecting the peak point of the autocorrelation function signal from said autocorrelator, executing a computation to produce a signal related to the velocity of said relatively moving object, and setting the sampling rate of said autocorrelator to a proper value.

2. The velocity detecting apparatus as defined in claim 1, wherein a temperature signal related to the temperature of the relatively moving object is applied to said processor, and said processor then corrects the velocity signal with reference to said temperature signal.

3. The velocity detecting apparatus as defined in claim 2, including means for transmitting a sensing signal through said relatively moving object and for detecting the propagation velocity of said sensing signal therethrough, said temperature signal being obtained by utilizing the correspondence between said propagation velocity of said sensing signal in the moving object and the temperature of the moving object.

* * * * *